US009367428B2

(12) United States Patent
Rhee et al.

(10) Patent No.: US 9,367,428 B2
(45) Date of Patent: Jun. 14, 2016

(54) TRANSPARENT PERFORMANCE INFERENCE OF WHOLE SOFTWARE LAYERS AND CONTEXT-SENSITIVE PERFORMANCE DEBUGGING

(71) Applicant: NEC Laboratories America, Inc., Princeton, NJ (US)

(72) Inventors: Junghwan Rhee, Princeton, NJ (US); Hui Zhang, Princeton Junction, NJ (US); Nipun Arora, Plainsboro, NJ (US); Guofei Jiang, Princeton, NJ (US); Chung Hwan Kim, West Lafayette, IN (US)

(73) Assignee: NEC Corporation (JP)

( * ) Notice: Subject to any disclaimer, the term of this patent is extended or adjusted under 35 U.S.C. 154(b) by 0 days.

(21) Appl. No.: 14/512,653

(22) Filed: Oct. 13, 2014

(65) Prior Publication Data
US 2015/0106794 A1    Apr. 16, 2015

Related U.S. Application Data

(60) Provisional application No. 61/890,398, filed on Oct. 14, 2013.

(51) Int. Cl.
*G06F 11/36* (2006.01)
*G06F 9/44* (2006.01)

(52) U.S. Cl.
CPC .................................. *G06F 11/3636* (2013.01)

(58) Field of Classification Search
CPC .................................................... G06F 11/3688

USPC ......................................................... 717/133
See application file for complete search history.

(56) References Cited

U.S. PATENT DOCUMENTS

| 6,049,666 | A |    | 4/2000 | Bennett et al. |
|---|---|---|---|---|
| 8,359,219 | B2 | * | 1/2013 | Chishti ............... H04M 3/5232 705/7.13 |
| 2003/0066055 | A1 |   | 4/2003 | Spivey |
| 2005/0262491 | A1 | * | 11/2005 | Gu ........................ G06F 8/4443 717/151 |
| 2006/0130001 | A1 | * | 6/2006 | Beuch ................. G06F 11/3466 717/130 |
| 2013/0139155 | A1 | * | 5/2013 | Shah .................... G06F 9/45558 718/1 |

OTHER PUBLICATIONS

Graham, S. et al., "GPROF: A Call Execution Profiler," Jun. 1982. pp. 120-126. vol. 17, Issue 6.
Luk, C. et al., "Pin: Building Customized Program Analysis Tools With Dynamic Instrumentation," Jun. 2005. pp. 1-11.
Nethercote, N. et al., "Valgrind: A Framework for Heavyweight Dyanmic Binary Instrumentation," Jun. 2007. pp. 1-12.

* cited by examiner

*Primary Examiner* — John Chavis
(74) *Attorney, Agent, or Firm* — Joseph Kolodka (57) ABSTRACT

Methods and systems for performance inference include inferring an internal application status based on a unified call stack trace that includes both user and kernel information by inferring user function instances. A calling context encoding is generated that includes information regarding function calling paths. Application performance is analyzed based on the encoded calling contexts. The analysis includes performing a top-down latency breakdown and ranking calling contexts according to how costly each function calling path is.

10 Claims, 10 Drawing Sheets

```
S : a call stack < s₀,...,sₙ >        ▷ order: bottom to top
root : the root node of the calling context tree.
 1: function ENCODEID(S)
 2:     Node *n = &root
 3:     for s in S do
 4:         n = getChild(n, s)
 5:     return getLeafID(n)
 6: function GETCHILD(Node* n, Stack frame s)
 7:     if {∃n'|s == n' → s and n' ∈ n → children} then
 8:         return n'
 9:     else
10:         n' = new Node (s), n' → parent = n, n' → s = s
11:         n → children = n → children ∪ n'
12:         n' → id_node = node_counter++
13:         map_node[n' → id_node] = n'
14:         return n'
15: function GETLEAFID(Node* n)
16:     if n → id_leaf == UNDEFINED then
17:         n → id_leaf = leaf_counter++
18:         map_leaf[n → id_leaf] = n
19:     return n → id_leaf
20: function DECODEID(i)
21:     Node *n = map_leaf[i]
22:     while *n != root do
23:         print n
24:         n = n → parent
```

$S_k : <s_0,...,s_n>$ at time $t_k$      ▷ order: bottom to top
$T = <(t_0,S_0),...,(t_k,S_k),...,(t_m,S_m)> $ : trace is a sequence of a pair, time $t_k$ and a call stack $S_k$.
1: function EXTRACTINSTANCES(Trace $T$)
2:     for $(t_k,S_k)$ in $T$ do
3:         $newEvent(t_k,S_k)$
4:     $closeRegisterAll()$
5: function NEWEVENT(time $t_k$, Stack frame $S_k$)
6:     initialize $This, Last, Register$
7:     $d = 0$                           ▷ process from bottom to top
8:     $AllNew = 0$
9:     $cid = getEncodingID(S_k)$
10:    for $s_i$ in $S_k$ do
11:        $isNew = (s_i == Last[d])$
12:        if $AllNew==1$ then
13:            $isNew = 1$
14:        if $isNew==1$ then
15:            $AllNew = 1$
16:        $This[d++] = (s_i,d,isNew)$
17:    if $|Last| > |This|$ then
18:        $i = Last[|Last|-1]$
19:        while $i >= |This|$ do
20:            $closeRegister(t_k,i)$
21:            remove $Last[i--]$
22:    reverse $This$
23:    for $(s_i,d,isNew)$ in $This$ do
24:        if $isNew == 1$ then
25:            $closeRegister(t_k,d)$
26:            $nid = getNodeIDfromTree(cid,d,|S_k|)$
27:            $Register[d] = [t_k,t_k,s_i,nid]$
28:        else
29:            $Register[d][1] = t_k$
30:        $Last[d] = s_i$
31:    $t_{last} = t_k$
32: function CLOSEREGISTER($t_k,d$)
33:    $(t_s,t_e,s_i,nid) = Register[d]$
34:    $t_{agg} = t_k - t_s, t_{con} = t_e - t_s$
35:    $newFunctionInstance(s_i,nid,t_{agg},t_{con})$
36:    remove $Register[d]$
37: function CLOSEREGISTERALL
38:    for $d$ in $(0, ..., |Register|)$ do
39:        $closeRegister(t_{last},d)$

$root_1$ : the root node of the CCT with small input.
$root_2$ : the root node of the CCT with large input.

1: function CALCULATEOWNLATENCYALL
2:     $CalculateOwnLatency(root_1)$
3:     $CalculateOwnLatency(root_2)$
4: function CALCULATEOWNLATENCY(Node *$n$)
5:     $t_{c.agg} = 0, t_{c.com} = 0$
6:     for $c$ in $n \to children$ do
7:         $CalculateOwnLatency(c)$
8:         $t_{c.agg}\mathrel{+}= c \to t_{agg}, t_{c.com} \mathrel{+}= c \to t_{com}$
9:     $t_{o.agg} = t_{agg} - t_{c.agg}, t_{o.com} = t_{com} - t_{c.com}$
10: function RANKPATHS($N$)
11:     $P_1 = getPathSet(root_1), P_2 = getPathSet(root_2)$
12:     for $p$ in $P_2$ do
13:         if $(\exists p'$ in $P_1 | p == p'$ ) then
14:             $t_{d.agg} = \Sigma$ diff $t_{o.agg}$ in each node in $p$ and $p'$
15:             $t_{d.com} = \Sigma$ diff $t_{o.com}$ in each node in $p$ and $p'$
16:         else
17:             $t_{d.agg} = \Sigma\, t_{o.agg}$ in each node in $p$
18:             $t_{d.com} = \Sigma\, t_{o.com}$ in each node in $p$
19:         $pset.append(t_{d.agg}, t_{d.com}, p)$
20:     Sort $pset$ using $t_{d.agg}$ and $t_{d.com}$ and return top $N$

TRANSPARENT PERFORMANCE INFERENCE OF WHOLE SOFTWARE LAYERS AND CONTEXT-SENSITIVE PERFORMANCE DEBUGGING

RELATED APPLICATION INFORMATION

This application claims priority to provisional application No. 61/890,398 filed Oct. 14, 2013, the contents thereof are incorporated herein by reference.

BACKGROUND OF THE INVENTION

Performance problems are common in software projects. Profiling is a form of software analysis that measures operational characteristics of the software. While traditional profilers have been effective tools in the well-defined testing environment of the debugging stage, many performance bugs survive this review process and cause inconvenience and frustration to end-users. The complexity of diverse and interdependent software layers, which are integrated and updated separately in the deployment, makes complete testing and containment of performance bugs a challenge.

Most profilers embed profiling code into the source code of a software project under test. Although source code may be available during the debugging stage, it is hard to use such tools after debugging due to the fact that much software is distributed in binary formats. Dynamic translators are popularly used in the research community for convenience of instrumentation, and some profiling tools are based on them. These tools can transparently insert profiling instructions into software without need for the source code. However, the overhead of such tools is high, again making them suitable only for the debugging stage.

BRIEF SUMMARY OF THE INVENTION

A method for performance inference includes inferring an internal application status based on a unified call stack trace that includes both user and kernel information by inferring user function instances. A calling context encoding is generated that includes information regarding function calling paths. Application performance is analyzed based on the encoded calling contexts. The analysis includes performing a top-down latency breakdown and ranking calling contexts according to how costly each function calling path is.

A system for performance inference includes an inference module includes a processor configured to infer an internal application status based on a unified call stack trace that includes both user and kernel information by inferring user function instances and to generate a calling context encoding that includes information regarding function calling paths. A performance analysis module is configured to analyze application performance based on the calling context encoding by performing a top-down latency breakdown and ranking calling contexts according to how costly each function calling path is.

DETAILED DESCRIPTION

Embodiments of the present principles infer the performance of a program and analyzes performance bugs using unified stack traces (which include both user and kernel information) from production tracers as input. The present embodiments thereby achieve a lightweight and in-depth contextual performance analysis.

First, the present embodiments infer the latency of software in multiple program layers in a fine-grained and context-sensitive manner. Rather than directly monitoring the program, the present embodiments use the unified stack trace provided by an efficient production event tracer as input. This makes the present principles easy to employ with production systems as an offline analysis stage without any runtime overhead.

Second, the present embodiments use a ranking mechanism of costly call paths to ease the localization of root causes of performance bugs. The fine-grained details of many software layers generate massive amounts of information. Ranking call paths simplifies the analysis process by highlighting the most costly function call paths during the execution of the program. These analyses do not need access to the source code or recompilation of the program. As a result, the present embodiments are convenient to use in a post-debug stage.

Figure 1:
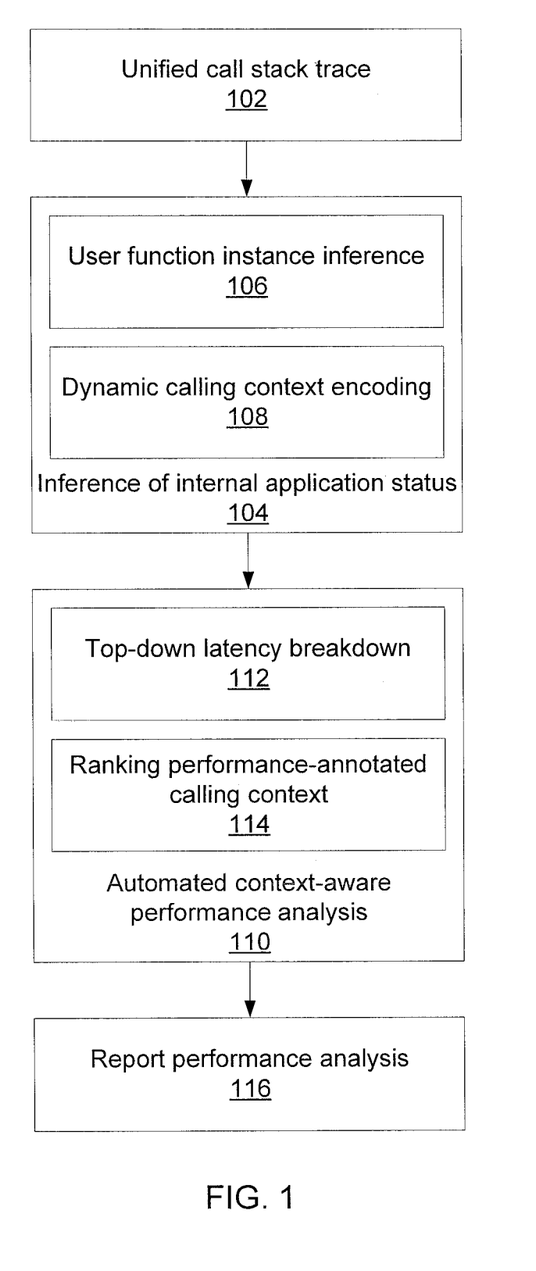
FIG. 1 is a block/flow diagram showing a method for inferring application performance in accordance with the present principles.

Referring now to FIG. 1, a method for performance inference is shown. Block 102 accepts as input a unified call stack trace, which is the stack trace event including both user programs and kernel code information. One exemplary embodiment uses stackwalking events in an event tracer. This event stream covering both user and kernel spaces is generated by the kernel. Therefore, the timestamps of the events are of kernel events, while the present analyses are most concerned with latencies in the user program function calls.

Block 104 therefore infers information about internal application status. Block 106 in particular infers user function instances. Block 106 then infers calling context. Calling context is a list of active functions in the stack representing a specific sequence of function calls. Block 106 uses calling context for performance debugging, where a stack event in the trace represents a calling context. To make handling of calling context efficient, block 108 encodes the calling context by representing a list of functions as an integer. Calling contexts can then be handled with significantly lower overhead in computation and memory.

The context-aware performance analysis is performed by block 110, which includes a top-down latency breakdown in block 112 and a ranking of performance-annotated calling context in block 114. The function latencies inferred in block 104 are for all software layers. Since there are periods of time that are overlapped across multiple functions in the call stack, block 112 extracts the actual time that contributes to the delay.

Block 114 addresses the scale of the information to analyze. A program's dynamic context can represent a massive amount of information. The ranking scheme of block 114 ranks the calling contexts that present the top N most costly function call paths. The final output of the analysis is then generated in block 116.

Figure 2:
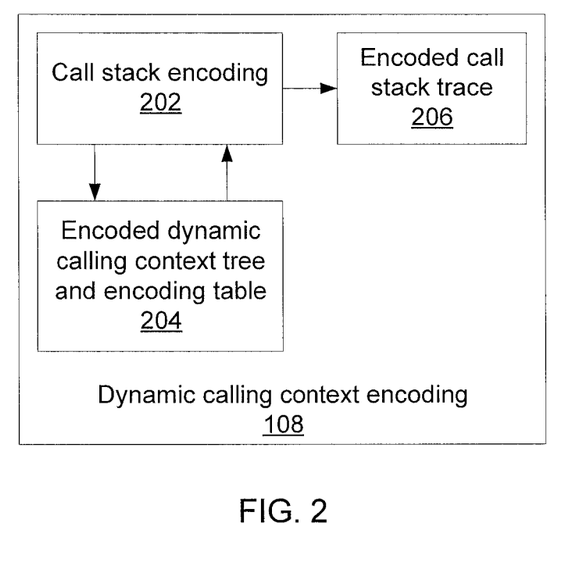
FIG. 2 is a block/flow diagram showing a method for dynamic calling context encoding in accordance with the present principles.

Referring now to FIG. 2, additional detail on dynamic calling context encoding block 108 is shown. Block 202 performs call stack encoding based on the unified call stack trace 102 and produces a trace of encoded IDs as block 206. During this process, all contexts that appear in the trace are organized into two data structures: an encoded dynamic calling context tree and an encoding table in block 204. Duplicate contexts are encoded as the same ID using these data structures.

Figure 3:
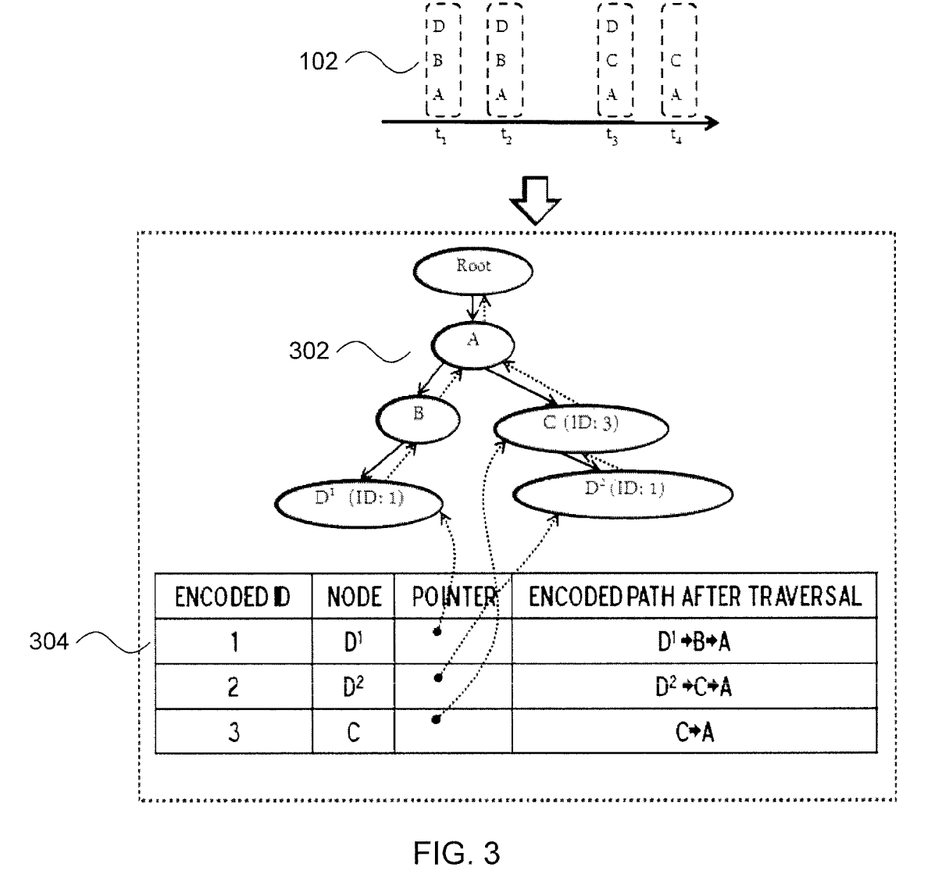
FIG. 3 is a diagram showing an example dynamic calling context coding in accordance with the present principles.

Referring now to FIG. 3, an encoded dynamic calling context tree 302 is shown with a corresponding encoding table 304. The events in the stack trace 102 are used to form the dynamic calling context tree 302, which is described by the encoding table 304. Each trace is encoded as an Encoded ID, corresponding to an end node, a pointer to the end node in the tree 302, and a description of the path traversed through the tree 302.

Figure 4:
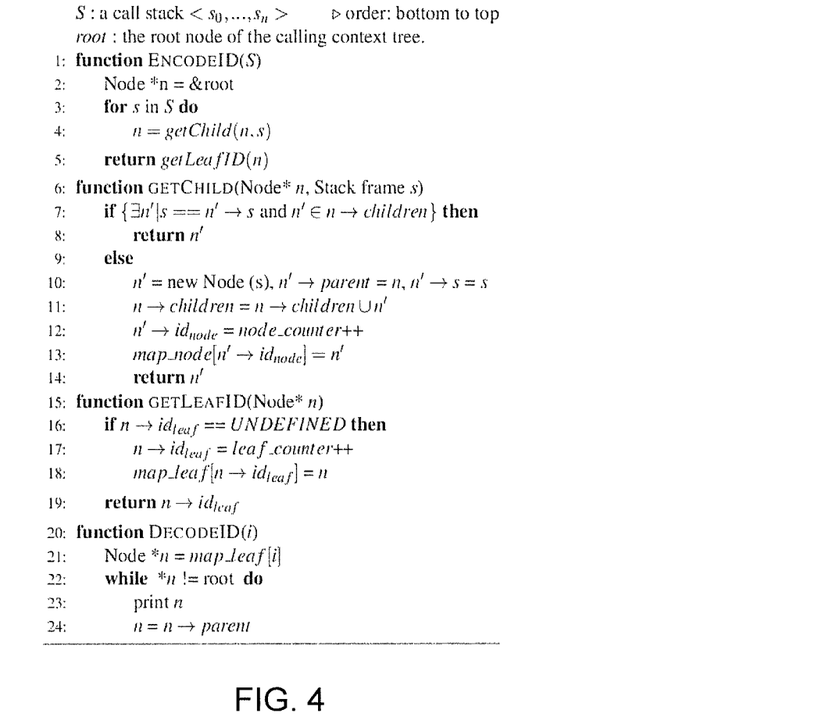
FIG. 4 is pseudocode for call stack encoding in accordance with the present principles.

Referring now to FIG. 4, pseudocode for call stack encoding is shown. To use the example of FIG. 3, the stack events occur at different timestamps, $t_1$, $t_2$, $t_3$, and $t_4$. For the first event S, at $t_1$, the EncodeID function is called to create the nodes A, B, and D from the main function by calling getChild for each function in the stack event. The getChild function is a utility function to create a node in the tree 302.

The present embodiments thereby store the encoded ID in the last node in the calling context path and maintain the mapping between the ID and the node. The getLeafID function first determines whether any prior assignment of an ID to this node exists. If it is a new node, a unique ID is assigned and the pair of the ID and the pointer to the node is stored in the encoding table 304. In the example of the first stack trace at $t_1$, the last node is D1. The encoding table at the bottom of FIG. 3 shows that encoded ID 1 is assigned to this path, with its pointer pointing to the node D1. It should be noted that the calling context tree 302 uses a different node for a given function if it is reached through a different sequence of functions. For example, D1 is shown as occupying a different node from D2 in FIG. 3.

For the same function pattern, EncodeID will reuse existing nodes to encode the stack event. For example, the next event at T2 has the identical path. Thus, this function returns an encoded ID of 1 again without creating additional nodes. After the third and fourth events are processed, the encoded calling context tree and encoding table are constructed as shown at the bottom of FIG. 3.

An encoded ID can be converted back to a series of functions using the DecodeID function described in FIG. 4. This function finds the node pointer corresponding to the input ID. The encoded path is recovered by traversing parent pointers upward until the root node is reached. For example, FIG. 3 shows that the ID 1 points to the node D1. Parent nodes are traversed upwards to discover the decoded path.

Figure 5:
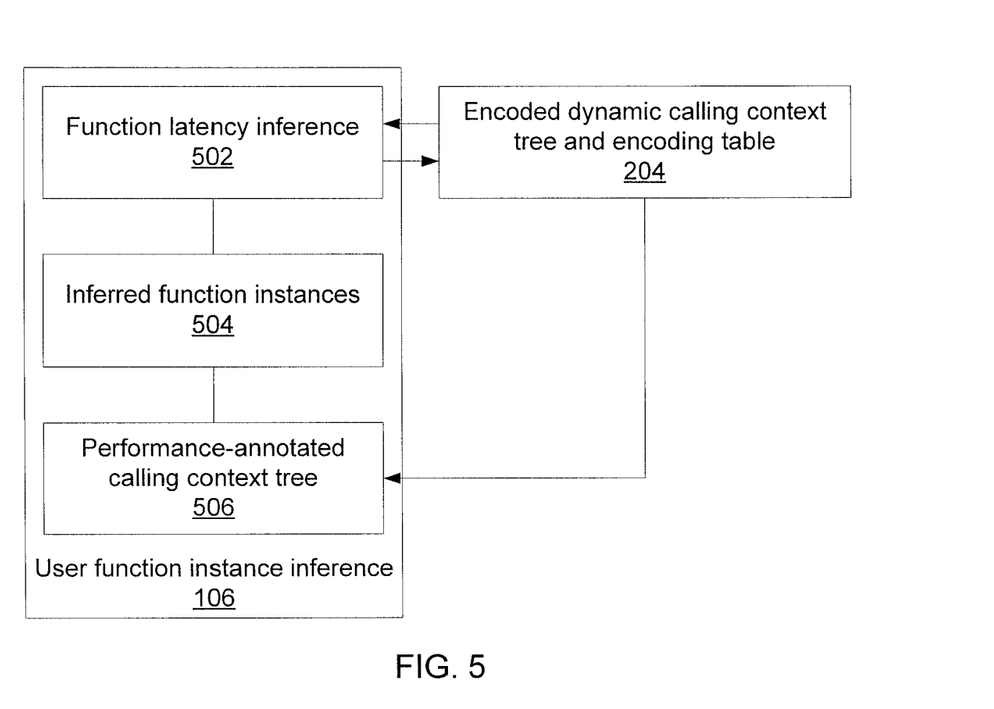
FIG. 5 is a block/flow diagram showing a method for function instance inference in accordance with the present principles.

Referring now to FIG. 5, additional detail on user function instance inference block 106 is shown. Block 502 infers function latency from a trace of encoded call stack events and the dynamic calling context tree and encoding table 204. Once performance information 504 is extracted, it is accumulated into the encoded dynamic calling context tree 204, thus creating a performance annotated calling context tree 506.

Block 502 scans events in the timeline in time order (e.g., T1->T2->T3->T4) and infers the function calls and returns based on the appearance and disappearance of functions in the stack. Considering the example traces of FIG. 3, if a function B appears at time T1 and disappears at T3, the execution time for B may be considered as being the difference between timestamps T3 and T1. There are multiple ways to approach this estimation. Aggressive estimation considers the return as the appearance of a new event. Thus, T1-T3 would be the estimated time for the function B. A conservative estimate considers the lifetime based on the actual appearance in the stack. Following the above example, a gap of time exists between T2 and T3, and the function B might complete immediately after T2. Thus the conservative estimate for the duration of B would be T1-T2.

Figure 6:
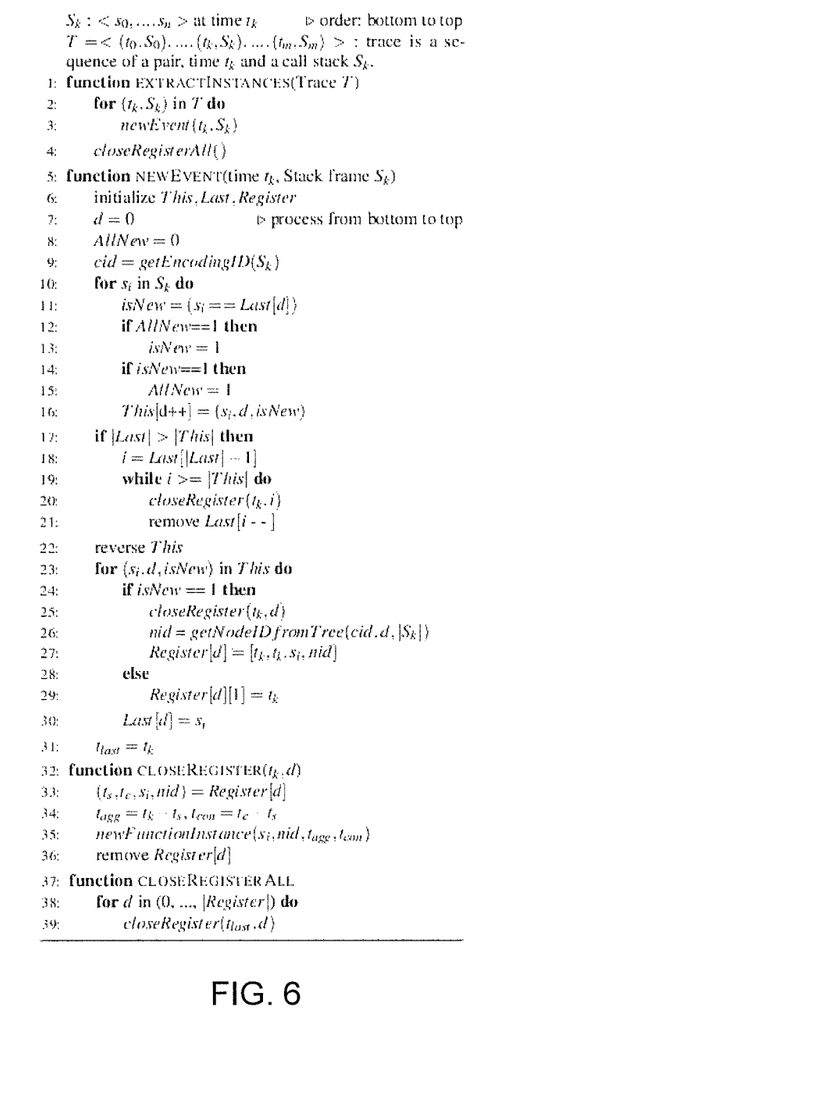
FIG. 6 is pseudocode for function latency inference in accordance with the present principles.

Referring now to FIG. 6, pseudocode for function latency inference block 502 is shown. The extractInstances function calls the newEvent function to process each stack event. Once a function appears in the stack, the algorithm keeps track of it by putting it in the Register data structure. When this function disappears, it is considered to be returned. Then the tracked time so far is stored, along with the function name and its specific call context in line 35.

At the end of the trace, all functions are considered as having returned. For this operation, the closeRegisterAll function is called, which closes all registered functions and records the corresponding function instances.

Figure 7:
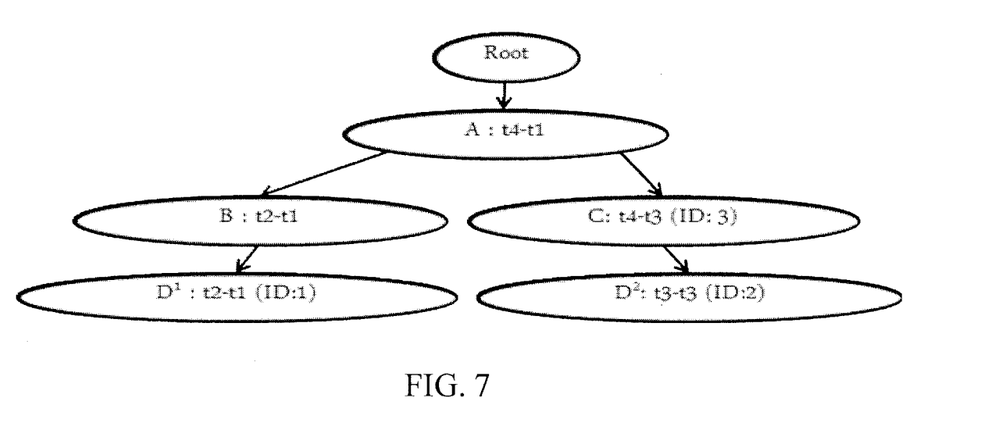
FIG. 7 is a diagram showing a performance-annotated calling context tree in accordance with the present principles.

Referring now to FIG. 7, an exemplary performance-annotated calling context tree 506 is shown. It is important to record the extracted function information along with its context information to understand why performance anomalies occur. For this purpose, an extended representation is used in the form of a performance-annotated calling context tree 506, which combines the context information and the estimated performance latencies of individual functions. The tree shown is based on the traces from FIG. 3. The conservative estimation is used below for the sake of brevity.

Figure 8:
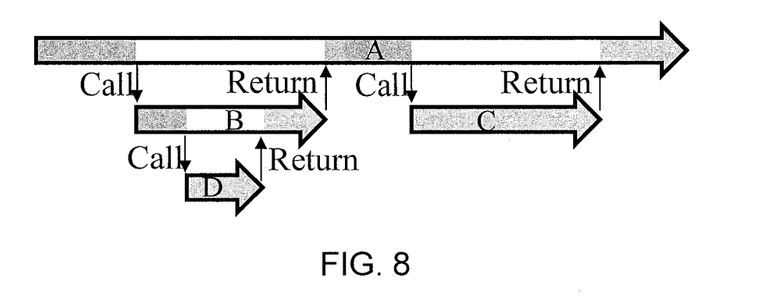
FIG. 8 is a diagram showing extracted function latencies in accordance with the present principles.

Referring now to FIG. 8, an illustration of extracted function latencies is shown. The function A runs through the entire period of execution. This may be, for example, the main function which is executed as the first function and then sits in the stack in the entire execution of the program. A further calls other functions B, C, and indirectly D, such that the functions have overlapping periods of time in their latencies. The dark portions of the arrows represent the actual time when the function truly contributes to the latency. To correctly localize the root cause of function latencies, the overlapping (white) time periods are subtracted.

Figure 9:
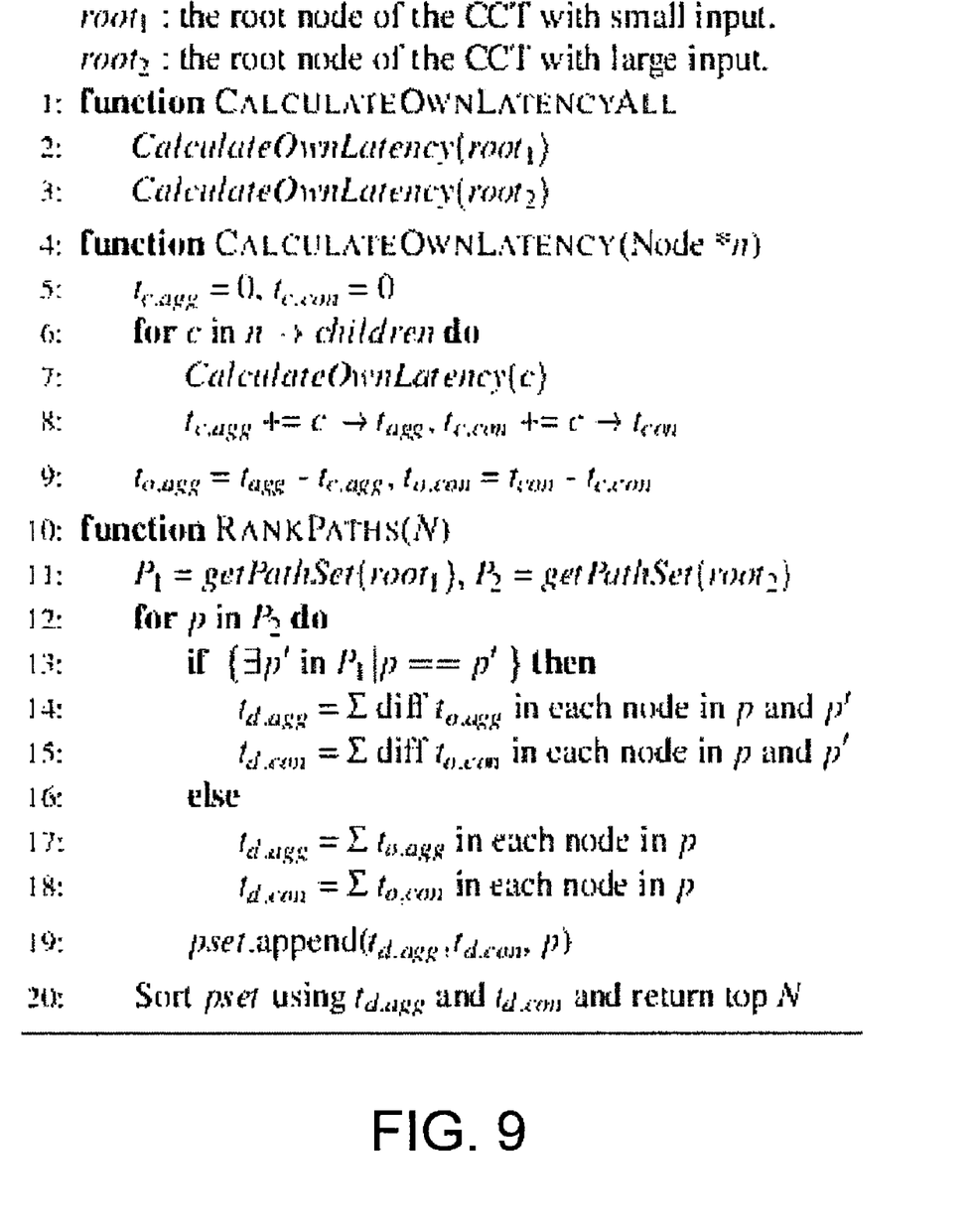
FIG. 9 is pseudocode for top-down latency breakdown in accordance with the present principles.

Referring now to FIG. 9, pseudocode for top-down latency breakdown and context ranking in blocks 112 and 114 respectively is shown. With input of a performance-annotated calling context tree, block 112 calculates own latency and removes the overlapped period by recursively visiting each node and subtracting the latency of child nodes. The outcome is a performance-annotated calling context tree with own latency.

The context calling tree can be very complex. To solve this problem, the present embodiments provide ranking of calling context to automate the localization of costly calling contexts in block 114. Block 114 produces a ranked costly calling context. One approach for ranking contexts using performance cost includes ranking based on the total cost of a path (i.e., the context).

Figure 10:
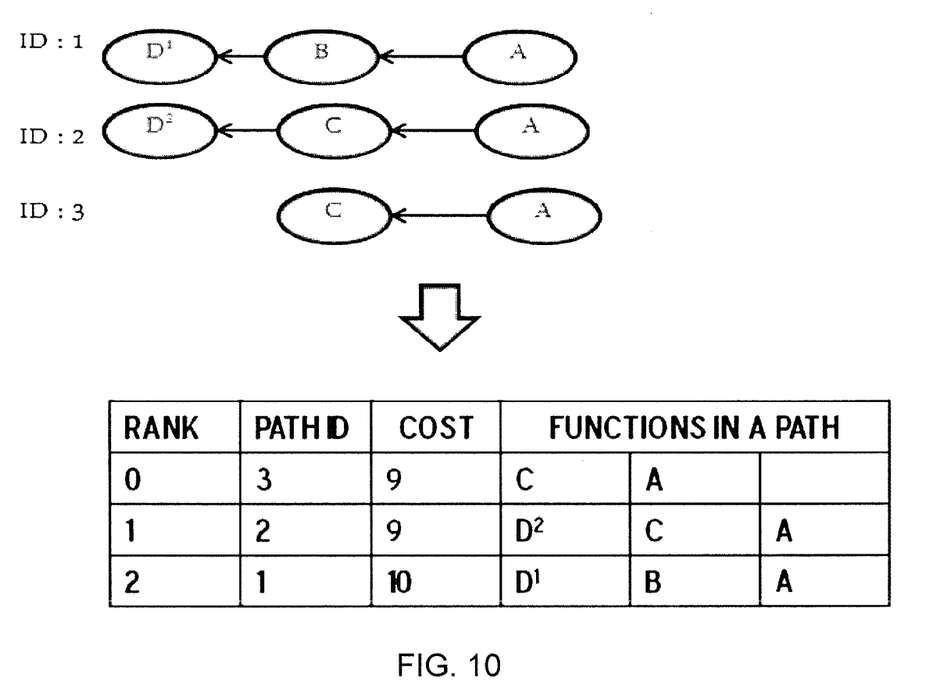
FIG. 10 is a diagram illustrating ranking based on total cost in accordance with the present principles.

Referring now to FIG. 10, ranking based on total cost is illustrated. Individual call paths are extracted from the calling context tree and the total cost of each path is determined. This example shows a simple scheme that uses the accumulated inferred latency in each node. For example, in the top path (ID 1), the functions D, B, and A respectively have the latency (T4-T1)-(T2-T1)-T4-T3) for A, (T2-T1)-(T2-T1) for B, and (T2-T1) for D. After summing the three latencies, the total for the path becomes T3-T1.

After the total cost for each path is calculated, the paths are ranked according to the cost. For example, if the first, second and third paths have respective costs of 10, 9, and 9, then the paths are ranked according to the matrix of FIG. 10. Paths are listed from the bottom in the order of their total costs. The path with the highest cost, for example path ID 1, is placed at the bottom of the matrix having the highest rank.

Many performance bug symptoms are triggered on a certain scenario of workload—for example, a large input size. During execution of a program, there may be functions that take high latency regardless of the size or input of a workload. In such a case, it is better to rank that portion of execution lower and put more emphasis instead on the workload scaling up with workload changes. To address such cases, the ranking may be formed using differences of two input workloads. The cost of each path is calculated as the sum of differences in each function in the two paths, prioritizing context sensitivity to workload changes. The RankPaths function of FIG. 9 shows the details of this calculation.

Line 11 generates the paths from two calling context trees. This enumerates the paths of large inputs and, for each path, FIG. 9 finds the same path in the paths of the small input. For paths that only exist in the second input P2, the cost for small input is considered to be zero by using only the path from P2. If the path is common in both path sets P1 and P2, the cost is calculated as the sum of differences of each function node.

The computed values and the function information are stored in a list data structure. After the iteration is finished, the list is sorted in two ways using the computed difference of paths in the aggressive mode and conservative mode. A user specifies the total number N of results and these results are presented as the report in block 116. This reveals how sensitive each path's cost is to the input.

Rather than employing profiling code into a monitored program to collect statistics, the present embodiments use the unified stack trace of the entire system layers generated by an OS tracer. This allows the present embodiments to avoid hooks into the program and avoids needing access to the source code. While the input is coarse-grained, the present embodiments provide detailed information on function latencies inferred from stack traces. Furthermore, the ranking of costly calling contexts localizes the candidates of the root causes of performance anomalies.

Figure 11:
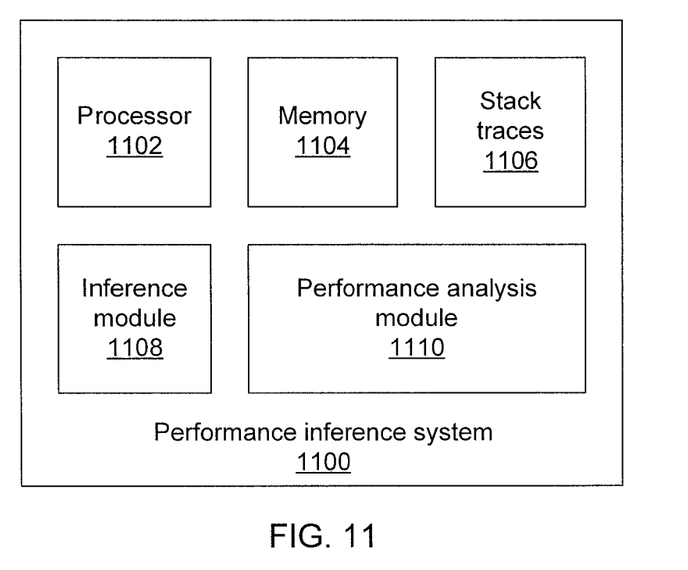
FIG. 11 is a block diagram of a system for performance inference in accordance with the present principles.

Referring now to FIG. 11, a system for performance inference 1100 is shown. The system 1100 includes a processor 1102 that executes a program and a memory 1104 that stores stack traces 1106 of the program. An inference module 1108 accesses the stack traces to infer the application's status and to build a dynamic calling context encoding. A performance analysis module 1110 analyzes the latencies of functions in the application and ranks calling contexts according to which are most costly.

The foregoing is to be understood as being in every respect illustrative and exemplary, but not restrictive, and the scope of the invention disclosed herein is not to be determined from the Detailed Description, but rather from the claims as interpreted according to the full breadth permitted by the patent laws. Additional information is provided in Appendix A to the application. It is to be understood that the embodiments shown and described herein are only illustrative of the principles of the present invention and that those skilled in the art may implement various modifications without departing from the scope and spirit of the invention. Those skilled in the art could implement various other feature combinations without departing from the scope and spirit of the invention.

The invention claimed is:

1. A method for performance inference, comprising:
   inferring an internal application status based on a unified call stack trace that includes both user and kernel information by inferring latencies for individual function calls in user function instances;
   generating a calling context encoding that includes information regarding function calling paths and represents each calling context as a distinct integer; and
   analyzing application performance based on the encoded calling contexts, comprising:
   performing a top-down latency breakdown, comprising:
      estimating a total running time of each function in a stack trace; and
      excluding running times attributable to later-starting, concurrently running functions to determine a latency attributable to each function;
   annotating the calling context encoding with inferred performance information; and
   ranking calling contexts according to how costly each function calling path is.

2. The method of claim 1, wherein estimating a total running time comprises finding a difference between a first stack trace in which a function appears and a first stack trace in which the function no longer appears.

3. The method of claim 1, wherein estimating a total running time comprises finding a difference between a first stack trace in which a function appears and a last uninterrupted stack trace in which the function appears.

4. The method of claim 1, wherein ranking calling contexts comprises ranking according to total cost for each function calling path.

5. The method of claim 1, wherein ranking calling contexts comprises ranking according to a difference in latency between two input workloads.

6. A system for performance inference, comprising:
   an inference module comprising a hardware processor configured to infer an internal application status based on a unified call stack trace that includes both user and kernel information by inferring latencies for individual function calls in user function instances, to generate a calling context encoding that includes information regarding function calling paths, and to annotate the calling context encoding with inferred performance information; and
   a performance analysis module configured to analyze application performance based on the encoded calling contexts by estimating a total running time of each function in a stack trace and excluding running times attributable to later-starting, concurrently running functions to determine a latency attributable to each function in a top-down latency breakdown and by ranking calling contexts according to how costly each function calling path is.

7. The system of claim 6, wherein the performance analysis module is further configured to find a difference between a first stack trace in which a function appears and a first stack trace in which the function no longer appears.

8. The system of claim 6, wherein the performance analysis module is further configured to find a difference between a first stack trace in which a function appears and a last uninterrupted stack trace in which the function appears.

9. The system of claim 6, wherein the performance analysis module is further configured to rank calling contexts according to total cost for each function calling path.

10. The system of claim 6, wherein the performance analysis module is further configured to rank calling contexts according to a difference in latency between two input workloads.

* * * * *